(12) United States Patent
Yu

(10) Patent No.: US 8,615,244 B2
(45) Date of Patent: *Dec. 24, 2013

(54) MEASUREMENT CONTROL METHOD, USER EQUIPMENT AND NETWORK-SIDE DEVICE

(71) Applicant: Huawei Technologies Co., Ltd., Shenzhen (CN)

(72) Inventor: Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,890

(22) Filed: Nov. 14, 2012

(65) Prior Publication Data

US 2013/0072200 A1    Mar. 21, 2013

Related U.S. Application Data

(63) Continuation of application No. 12/604,485, filed on Oct. 23, 2009, now Pat. No. 8,335,517, which is a continuation of application No. PCT/CN2008/070802, filed on Apr. 25, 2008.

(30) Foreign Application Priority Data

Apr. 30, 2007   (CN) .......................... 2007 1 0074199
Aug. 7, 2007    (CN) .......................... 2007 1 0137560

(51) Int. Cl.
*H04W 24/10* (2009.01)

(52) U.S. Cl.
USPC ..... 455/440; 455/450; 455/456.1; 455/432.2; 370/328; 370/329; 370/332

(58) Field of Classification Search
USPC ........ 455/435.2, 436, 452.2, 453, 432.3, 440, 455/456.1, 432.1; 379/377; 324/509; 361/87; 73/762.23; 370/328, 329, 332
See application file for complete search history.

(56) References Cited

U.S. PATENT DOCUMENTS 6,243,568 B1 *  6/2001  Detlef et al. ................ 455/226.4
6,584,311 B1 *  6/2003  Sorenson et al. ........... 455/432.1
6,625,451 B1 *  9/2003  La Medica et al. ............ 455/434

(Continued)

FOREIGN PATENT DOCUMENTS

CN    1369979 A    9/2002
CN    1635818 A    7/2005

(Continued)

OTHER PUBLICATIONS

Second Chinese Office Action issued in corresponding Chinese Patent Application No. 200710137560.1, Mar. 29, 2010, 9 pages. (Partial Translation).

(Continued)

*Primary Examiner* — Mahendra Patel
(74) *Attorney, Agent, or Firm* — Slater & Matsil, L.L.P.

(57) ABSTRACT

A measurement control method is disclosed. A user equipment (UE) receives measurement indication information from a network and initiated by the network. The measurement indication information includes an identification of an area of a current cell where the UE is located. The UE determines whether the identified area is within a preferred area of the UE. The UE performs a measurement process if the identified area is not within a preferred area of the UE.

13 Claims, 2 Drawing Sheets

(56) References Cited

U.S. PATENT DOCUMENTS

| | | | |
|---|---|---|---|
| 7,349,695 B2* | 3/2008 | Oommen et al. | 455/432.1 |
| 7,747,251 B1* | 6/2010 | Pippert et al. | 455/432.1 |
| 7,894,812 B1* | 2/2011 | Durig et al. | 455/432.3 |
| 7,907,946 B2* | 3/2011 | Welnick et al. | 455/434 |
| 2002/0060995 A1* | 5/2002 | Cervello et al. | 370/332 |
| 2003/0040313 A1 | 2/2003 | Hogan et al. | |
| 2003/0232594 A1 | 12/2003 | Shaheen | |
| 2006/0125619 A1* | 6/2006 | Calvi et al. | 340/500 |
| 2006/0218271 A1* | 9/2006 | Kasslin et al. | 709/224 |
| 2007/0077927 A1* | 4/2007 | Zhao et al. | 455/435.2 |
| 2007/0254679 A1 | 11/2007 | Montojo et al. | |
| 2010/0022242 A1* | 1/2010 | Nizri et al. | 455/435.2 |
| 2010/0041412 A1 | 2/2010 | Yu | |

FOREIGN PATENT DOCUMENTS

| | | |
|---|---|---|
| CN | 1867188 A | 11/2006 |
| CN | 1997202 A | 7/2007 |
| CN | 101299860 B | 10/2010 |
| EP | 1646261 A2 | 4/2006 |

OTHER PUBLICATIONS

3GPP 3$^{rd}$ Generation Partnership Project; Technical Specification Group Radio Access Network; Evolved Universal Terrestrial Radio Access (E-UTRA) User Equipment (UE) procedures in idle mode (Release 8); 3GPP TS 36.304 V1.0.0, Jun. 2007, total 24 pages.

3GPP TSG-RAN4, E-UTRA Cell Selection and cell Reselection Aspects, Jun. 25-29, 2007, total 5 pages.

3GPP TSG-RAN WG2, E-UTRA Measurements and Cell Reselection Considerations, Jun. 25-29, 2007, total 5 pages.

3GPP TSG-RAN WG2, High level mobility principles in a heterogeneous network, Jun. 25-29, 2007, total 4 pages.

3GPP TSG-RAN WG2, Mobility uses cases based on the access pipe concept, Jun. 25-29, 2007, total 5 pages.

3GPP TSG-RAN2, UE specific intra E-UTRAN (inter-frequency) and inter-RAT cell reselection, Jun. 25-29, 2007, total 5 pages.

3GPP TSG-RAN WG2, Prioritisation in UTRAN-LTE interworking, Nov. 5-9, 2007, total 6 pages.

3GPP TSG-RAN WG4, Text proposal for mobility requirements for E-UTRA to UTRA, Nov. 5-9, 2007, total 7 pages.

English Translation of the Written Opinion of the International Search Authority for PCT application No. PCT/CN2008/070802, Jul. 22, 2008, total 5 pages.

First office action for Chinese application No. 200710074272.6, dated Sep. 7, 2011, total 25 pages.

First office action issued in corresponding U.S. Appl. No. 13/294,876, dated Feb. 6, 2012, total 21 pages.

Second office action of corresponding Chinese Patent Application No. 200710074272.6, mailed on Apr. 20, 2012, and English translation thereof, 12 pages total.

Notice of allowance of corresponding U.S. Appl. No. 13/294,876, mailed on Jul. 2, 2012, 26 page total.

Office action issued in corresponding U.S. Appl. No. 12/604,485, dated Apr. 25, 2012, total 20 pages.

International Search Report received in PCT application No. PCT/CN2008/070802, Aug. 14, 2008, total 2 pages.

* cited by examiner

MEASUREMENT CONTROL METHOD, USER EQUIPMENT AND NETWORK-SIDE DEVICE

This application is a continuation of U.S. patent application Ser. No. 12/604,485, filed on Oct. 23, 2009, which is a continuation of International Application No. PCT/CN2008/070802, filed on Apr. 25, 2008, which claims priority to Chinese Patent Applications Nos. 200710137560.1 filed on Aug. 7, 2007, and 200710074199.2, filed on Apr. 30, 2007. All of these applications are hereby incorporated by reference in their entireties.

TECHNICAL FIELD

The disclosure relates to the field of communication technology, and more particularly to a measurement control method, user equipment and a network-side device for realizing the method.

BACKGROUND

It is well known that, an overload problem possibly occurs in actual operations of networks for wireless communication systems such as a universal mobile telecommunications system (UMTS). In the case of overloading, in order to guarantee the quality of service (QoS) for currently connected users, new users are usually restricted from accessing the network, or relocated to frequency layers or radio access technologies (RATs) different from the current service cell.

The relocation of the users is mainly realized through a radio resource control (RRC) connection setup message or an RRC connection reject message during an RRC connection setup process, or realized through an RRC connection setup/release message during an RRC connection release process.

In the current technical solution, user equipment (UE) carries a measurement result of the frequency layer used or unused by the UE in an RRC connection request message to be sent to the network side. Therefore, when the network side needs to make a relocation indication for the UE, the network side may indicate the UE to be relocated to an appropriate frequency layer according to the measurement result reported by the UE.

The network side may not only indicate the UE to be relocated to different frequency layers, but also indicate the UE to be relocated to different RATs. However, the current relocation indication for the RAT in the UMTS is a blind indication. That is to say, the current UE does not measure the RAT, and thus does not have any RAT related measurement result that can be sent to the network side. Therefore, the network side has no support of the RAT measurement data when performing the RAT relocation indication.

In order to solve the problem about RAT blind indication in relocation, the UE is configured to perform an inter radio access technology (IRAT) handover measurement once before sending the RRC connection request message, and carry the measurement result in the RRC connection request message for being reported to the network side.

During the implementation of the disclosure, the inventor(s) found that the prior art has at least the following technical problems. Though the prior art may eliminate the RAT blind indication in relocation, the following two problems occurs.

First, the processing in the prior art may affect the call setup performance of the UE. The reason is that, during the time period from initiating a call setup request each time by the UE to sending an RRC connection request message to a base station (BS), the UE must perform an IRAT measurement, which inevitably extends the call setup delay.

Second, the UE usually performs unnecessary measurements and reports. The UE has no idea whether the network side relocates the UE after a call is initiated, so the UE needs to make a measurement each time before sending the RRC connection request message, and report a measurement result. Generally, the network side does not need to frequently relocate the UE, and thus the UE has made many unnecessary measurement and report tasks.

In addition, the requirements of automatic network configuration and optimization are proposed in a long term evolution (LTE) system. In order to support the automatic network optimization, the UE needs to perform some additional measurements to provide the measurement data to the network side, so as to enable the network side to perform data accumulation for network configuration and optimization. Moreover, in order to obtain the measurement data of the network in a complicated environment, the measurement and report triggered by the UE based on certain information are also needed.

In view of the above, the wireless communication system requires the UE to perform more information measurement, but currently no measurement control solution is able to reduce the impact of the measurement on the performance of the UE to the utmost extent while ensuring that the UE provides the measurement result to the network side in time.

SUMMARY OF THE INVENTION

Accordingly, in order to solve the above technical problems, the embodiments of present invention are directed to a measurement control method, so as to reduce the impact of the measurement on the performance of the UE to the utmost extent when the UE provides a measurement result to a network side.

Furthermore, the embodiments of present invention are also directed to a UE that implements a measurement control.

The embodiments of present invention are also directed to a network-side device that implements a measurement control.

In order to solve the above problems, the following technical solutions are provided in the embodiments of the present invention.

A measurement control method is provided in an embodiment of the present invention. The method includes the following steps.

A UE receives measurement indication information provided by a network side.

The UE determines that the UE needs to perform a measurement according to the measurement indication information, and then performs a measurement process.

A UE is provided in an embodiment of the present invention. The UE includes a receiver, a determining module, and a measuring module.

The receiver is configured to receive measurement indication information provided by a network side, and send the measurement indication information to the determining module.

The determining module is configured to determine whether the UE needs to perform a measurement or not according to the received measurement indication information, and send notification information to notify the measuring module to perform a measurement process if it is determined that the UE needs to perform a measurement.

The measuring module is configured to perform a measurement process according to the received notification information.

A network-side device is provided in an embodiment of the present invention. The device includes an indication information providing module.

The indication information providing module is configured to determine measurement indication information required to be sent to a UE, and send the determined measurement indication information to the UE.

The network-side device is configured to determine measurement indication information required to be sent to the UE, and send the determined measurement indication information to the UE.

The UE is configured to receive the measurement indication information provided by the network side, determine whether the UE needs to perform a measurement or not according to the measurement indication information, and perform a measurement process after determining that the UE needs to perform a measurement.

In the embodiments of the present invention, the UE performs a measurement process only after receiving indication information from the network side and determining that the UE needs to perform a measurement according to the indication information. Hence the UE is able to perform a measurement meeting the requirements of the network side, and meanwhile it is ensured that the UE may perform a pertinent measurement instead of the one of high frequency and reduce the impact of the measurement on the performance of the UE to the utmost extent.

BRIEF DESCRIPTION OF THE DRAWINGS

The present invention will become better understood from the detailed description given herein below for illustration only, and thus is not limitative of the present invention, and wherein.

DETAILED DESCRIPTION OF ILLUSTRATIVE EMBODIMENTS

In order to make the objectives, technical solutions, and advantages of the present invention comprehensible, embodiments are described in detail below with reference to the accompanying drawings.

Figure 1A:
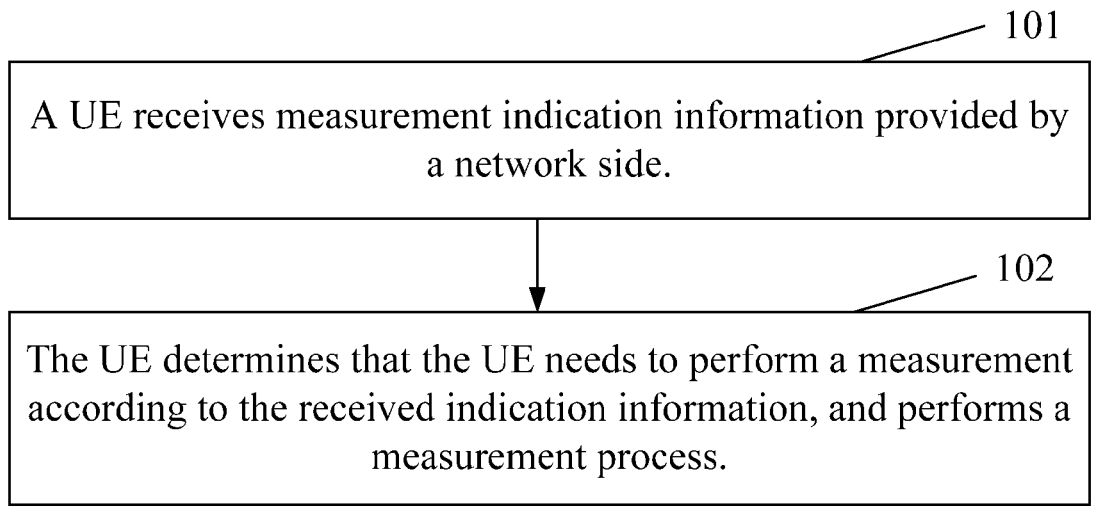
FIG. 1A is a flow chart illustrating an implementation according to an embodiment of the present invention.

FIG. 1A shows an implementation process of a method according to an embodiment of the present invention. The method includes the following steps.

In step 101, a UE receives measurement indication information provided by a network side.

The measurement indication information provided by the network side is configured to indicate whether the UE needs to perform a measurement process, wherein the measurement indication information may be sent by the network side to the UE through broadcasting and downlink signaling.

Specifically, the indication information may be load-related indication information from the network side, service-related indication information, or other types of information, and may include various types of indication information at the same time.

In step 102, the UE determines that the UE needs to perform a measurement according to the measurement indication information received, and then performs a measurement process.

The measurement process may be set according to actual requirements. For example, the measurement process is one selected from a group consisting of intra-frequency measurement, inter-frequency measurement, and inter-RAT measurement.

In this step, the UE performs a measurement process only after receiving the measurement indication information from the network side and determining that the UE needs to perform a measurement according to the measurement indication information, so that the UE is able to perform a measurement according to requirements of the network side. Therefore, it is ensured that the UE may not perform the measurement frequently but pertinently, and the impact of the measurement on the performance of the UE is reduced to the utmost extent.

Figure 1B:
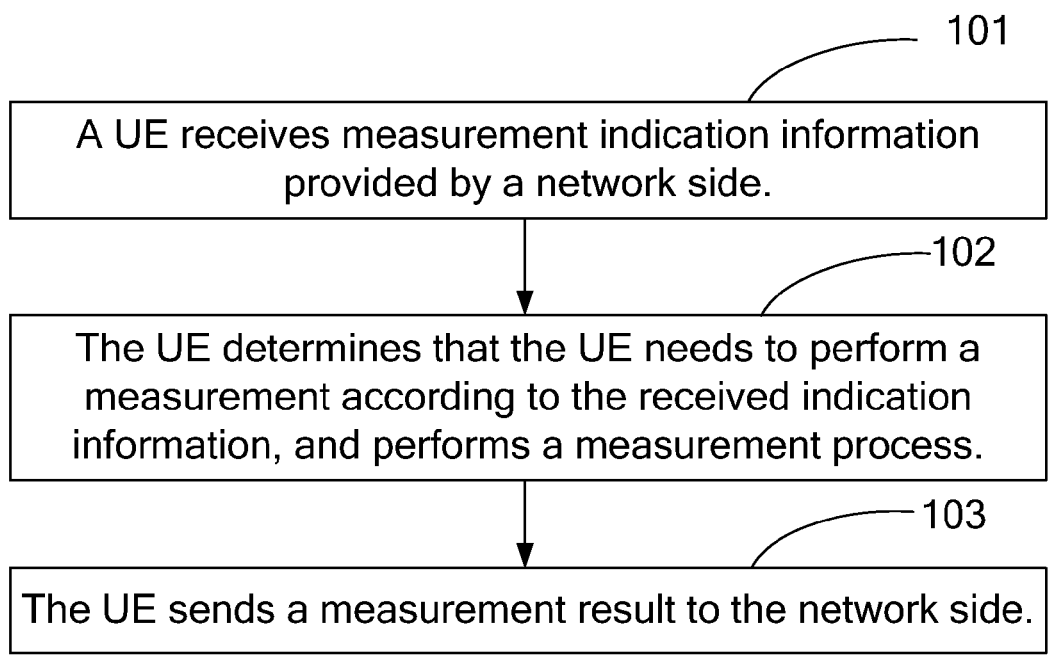
FIG. 1B is a flow chart illustrating another implementation according to an embodiment of the present invention.

Furthermore, after step 102, as shown in FIG. 1B, step 103 may be further added, i.e., the UE sends a measurement result to the network side. The UE may notify the network of the measurement result by carrying the measurement result in signaling, or directly notify the network through dedicated signaling, or notify the network through L1/L2 control signaling or through an MAC header. Certainly, other sending manners may also be adopted, as long as it is ensured that the measurement result is notified to the network.

In view of the above, in step 101, the UE may receive various types of measurement indication information, in which the specific implementations corresponding to the load-related indication information and the service-related indication information are respectively illustrated below in Embodiment 1 and Embodiment 2.

Embodiment 1 will be described now.

If the indication information provided by the network side is load-related, in step 102 that the UE determines, according to the received measurement indication information specifically, that the UE needs to perform a measurement includes: determining whether the network side is currently overloaded or not according to the load-related indication information, and if the network side is currently overloaded, determining that the UE needs to perform a measurement.

Specifically, the load-related indication information provided by the network side may be a load condition indicator or simply an overload indicator. If the load-related indication information is a load condition indicator, the load condition indicator may be an actual load value or a load rating indicator. Also the load condition indicator may be indication information corresponding to the load value or load rating. For example, an identifier corresponding to the load value or load rating is configured, and when the load-related indication information is required, the load value and load rating may not be directly provided, and instead, corresponding indication information thereof, i.e., the identifier corresponding to the load value or load rating, is provided.

If the load-related indication information is an overload indicator, in step 102, the UE directly determines that the network side is currently overloaded according to the overload indicator, and thus determines that the UE needs to perform a measurement.

If the load-related indication information is a load condition indicator, in step 102, the UE determines a load value or load rating of the current load according to the load condition indicator, and compares the load value or load rating with a load threshold. If the load value or load rating exceeds the load threshold, the network side is overloaded, and the UE determines that the UE needs to perform a measurement. The load threshold may be set by the UE or by the network side. If the load threshold is set by the network side, the network side needs to notify the UE of the load threshold through broadcasting, signaling, or other manners.

In Embodiment 1, the network side notifies the UE of the load-related indication information, and the UE determines whether the UE needs to perform a measurement or not according to the load-related indication information, so as to enable the network side to obtain the measurement result from the UE whenever necessary. Therefore, it is ensured that the UE may not perform the measurement frequently but pertinently, and the impact of the measurement on the performance of the UE is reduced to the utmost extent. If the network side needs to perform an RAT relocation on the UE when the load exceeds the preset threshold, the RAT relocation is performed according to measurement result received from the UE. The network side may also perform network configuration and optimization according to the measurement result received from the UE, and make analysis according to the measurement result received in a complicated environment.

Embodiment 2 will be described now.

If the information provided by the network side is service-related indication information, in step 102 that the UE determines, according to the measurement indication information received, that the UE needs to perform a measurement specifically includes: determining whether service-related information at the network side and service information of the UE satisfies a preset relationship or not according to the service-related indication information, and if service-related information at the network side and service information of the UE satisfies a preset relationship, determining that the UE needs to perform a measurement.

The service-related indication information provided by the network may be related information indicating services supported by the current network under the indication of the network side, for example, service identity (ID) information or differentiation indication information about the service information. In addition, the differentiation indication information includes, for example, a priority indicator, a level indicator, and a combination thereof.

If the service-related indication information is service indication information, in step 102, the UE determines services supported by the network side according to the service indication information, and compares to see whether services of the UE are consistent with the services supported by the network side or not. If services of the UE are not consistent with the services supported by the network side, the services at both sides are determined to meet the above preset relationship, i.e., the UE needs to perform a measurement when the services of the UE are not consistent with the services supported by the network side.

If the service-related indication information is differentiation indication information such as a priority indicator and/or a level indicator, in step 102, the UE determines a relationship between the services of the UE and the services supported by the network side according to the differentiation indication information, and determines whether the relationship conforms to a preset relationship or not according to a preset policy. In particular, when the priority and/or level indicator of the services of the UE is higher than the services supported by the network side, it is determined that the services at both sides satisfy the preset relationship, so that the UE needs to perform a measurement. Alternatively, when the priority and/or level indicator of the services of the UE is lower than the services supported by the network side, it is determined that the services at both sides satisfy the preset relationship, so that the UE needs to perform a measurement.

If the service-related indication information includes both the service indication information and the differentiation indication information, in step 102, it is first determined whether the services of the UE are consistent with the services supported by the network side or not, and if the services of the UE are not consistent with the services supported by the network side, it is directly determined that the UE needs to perform a measurement; otherwise, a relationship between the services of the UE and the services supported by the network side needs to be determined. According to a preset policy, when the priority and/or level indicator of the services of the UE is higher than the services supported by the network side, a measurement is performed; alternatively, when the priority and/or level indicator of the services of the UE is lower than the services supported by the network side, a measurement is performed. Certainly, other processing manners may also be set according to actual requirements, which are performed based on similar principles and may not be described herein again.

In Embodiment 2, the network side notifies the UE of the service-related indication information, and the UE determines whether the UE needs to perform a measurement or not according to the service-related indication information, so as to enable the network side to obtain the measurement result from the UE whenever necessary. Therefore, it is ensured that the UE may not perform the measurement frequently but pertinently, and the impact of the measurement on the performance of the UE is reduced to the utmost extent. When the network side needs to perform an RAT relocation on the UE, the RAT relocation is performed according to the received measurement result. The network side may also perform network configuration and optimization according to the received measurement result, and make analysis according to the received measurement result in a complicated environment.

Furthermore, in view of the above, the indication information provided by the network side may include both the load-related indication information and the service-related indication information, and in this case, different processing policies may be configured depending upon actual requirements. For example, in one processing policy, in step 102, upon receiving the indication information, the UE first determines the current specific load condition according to the received load-related indication information. If it is determined that the current load condition is overloaded, the UE directly determines that a measurement needs to be performed; otherwise, the UE further judges the relationship between the services supported by the network side and the services of the UE according to the received service-related indication information, and determines whether a measurement needs to be performed or not according to the preset policy in view of the relationship. The specific determination based on the service-related indication information is implemented in the same manner as that in Embodiment 2, so the details are not described herein again.

The above process considers both the load condition of the network side and the service-related indication information, thereby further ensuring that the UE only performs a measurement process when it is needed. Therefore, the measurement frequency for the UE is further reduced, the UE is enabled to measure pertinently, and the impact of the measurement on the performance of the UE is also lowered.

Moreover, in order to further reduce the measurement frequency for the UE, a measurement period is set. In step 102, after determining that a measurement needs to be performed, the UE may perform the measurement process after the measurement period expires. The measurement period is set according to the actual requirements, for example, according to service differentiation conditions. Specifically, as for real-time services, the measurement period is set relatively short, while as for non-real-time services, the measurement period is set relatively longer. Optionally, the measurement period may be set according to load conditions. For example, when the network load condition is satisfied, the measurement period is set relatively long. When the network load is rather large, the measurement period is set relatively short to ensure the real-time availability of the measurement result.

The measurement period may also be set based on information about the UE, such as electric quantity, discontinuous reception (DRX), moving speed, and quality of service (QoS) of the UE. For example, when the electric quantity of the UE is sufficient, the measurement can be performed for more times, so that the measurement period is set relatively long; while when the electric quantity is insufficient, the measurement should be reduced to the utmost extent, so that the measurement period is set relatively long. The measurement period may also be set according to the DRX period. If the DRX period is rather long, the measurement period is set relatively long; otherwise, the measurement period is set relatively long. Moreover, as the position of the UE changes rapidly under a high-speed movement, if the UE moves fast, the measurement period needs to be set relatively short; otherwise, the measurement period is set relatively long. In addition, when the measurement period is set according to the QoS, since the real-time adjustment is performed on services with high QoS requirements, the measurement period needs to be set relatively short; otherwise, the measurement period is set relatively long.

What is described above is only one example of the corresponding relationship between the measurement period and various influencing factors. In different application scenarios, the measurement period may be reset according to the above different relationship between the influencing factors and the measurement period.

Moreover, the UE may be set to perform the measurement before initiating an uplink connection, rather than performing the measurement directly after determining that the measurement needs to be performed. Correspondingly, in step 103, the UE sends the measurement result to the network side through uplink connection signaling associated with the uplink connection, and certainly other sending manners may also be adopted.

The above two processes further reduce the measurement frequency for the UE, ensure the UE to measure pertinently, and lower the impact of the measurement on the performance of the UE.

Furthermore, in order to reduce the report frequency of the UE, a report criterion may be set for the UE. Thus, in step 103, the UE first determines whether the report criterion is currently satisfied or not before sending the measurement result to the network side, and then sends the measurement result only after the report criterion is currently satisfied. The report criterion may be a set report threshold or report period, and the report criterion may be determined by the network side and then delivered to the UE.

In the above processing solution, if the network side requires all the UEs to perform measurements, the indication information may be directly notified to the UEs through broadcasting. If the network side only requires UEs with certain properties to perform measurements, the indication information only needs to be notified to such UEs. Moreover, if the network side sends the indication information through broadcasting, it needs to notify which UEs are required to perform measurements according to the indication information, or notify which UEs are not required to perform measurements. The above process is usually implemented by adding ID information of the UEs in a broadcast message. If the network side notifies the UEs through signaling, the signaling is respectively sent to the UEs.

However, in practice, a plurality of UEs similar to each other may exist in one network, for example, some UEs may share the same user subscription information such as user level and payment, some UEs have nearly the same moving speed, and some UEs have the same QoS requirements. In view of the above characteristics of the network, UE groups are further configured in this embodiment of the present invention based on the following factors including, but not limited to, user subscription information such as user level and payment, radio signal quality, hierarchical cell, moving speed, QoS, or any combination thereof.

After the UE groups are configured, the network side only needs to add UE group information such as corresponding ID and attributes of the UE group in the delivered broadcast message or downlink signaling when sending the measurement indication information directed to the UE group having certain characteristics to UEs in the UE group. Certainly, the network side may send broadcast messages or downlink signaling to UEs in a plurality of UE groups at the same time, and in this case, the network side only needs to add the UE group information into the broadcast messages or downlink signaling respectively. Accordingly, the UE determines, according to the received UE group information, whether the message or signaling is the one that needs to be received, i.e., the UE determines whether it belongs to the UE group that needs to perform a measurement or not. If the message or signaling is the one that needs to be received, i.e., the UE determines that it belongs to the UE group that needs to perform a measurement, the UE receives the message or signaling and performs a corresponding process, i.e., determining whether the UE needs to perform a measurement or not according to the measurement indication information; otherwise, the UE directly discards the message or signaling. Certainly, the UE may also first determine whether the UE needs to perform a measurement or not according to the measurement indication information, and then determine whether it belongs to the UE group that needs to perform a measurement or not, in which if it is determined that it belongs to the UE group that needs to perform a measurement, the UE performs a measurement.

After the UE groups are configured, the network side may set corresponding measurement indication information according to the characteristics of the UE groups. For example, if the user is of a high level or subscribes to a prepaid service (PPS), the network side generally has to ensure the access of the user, and may not consider the mobility of the user, so that no indication information is set for such UE group, or the indication information thereof is set as: the UE does not need to perform a measurement.

In addition, the UE group may further have one characteristic value selected from user subscription information, radio signal quality, hierarchical cell, moving speed, QoS, or any combination thereof. In this case, when sending the measurement indication information to each UE group, the network side may further send information about characteristic values set for the corresponding UE group, and may also send the information about characteristic values by means of broadcasting, paging, RRC signaling, L1/L2 control information, MAC header, and so on. The UE in each UE group compares the information about characteristic values carried in the measurement indication information with the characteristic values of the UE group, and decides whether it needs to further determine whether to perform a measurement according to the measurement indication information based on a preset policy. Alternatively, the UE first determines whether to perform a measurement or not according to the measurement indication information, and then compares to see whether the indicated characteristic values and the characteristic values of the UE group satisfy a preset relationship or not according to the preset policy after determining that the measurement needs to be performed. If the indicated characteristic values and the characteristic values of the UE group satisfy a preset relationship, the UE performs the measurement. The preset policy may be configured in the following manners according to actual requirements. For example, when the characteristic values sent from the network side and the characteristic values of the UE group satisfy a certain condition, no matter what kind of information is carried in the measurement indication information, the UE does not need to perform a measurement. Alternatively, only when the characteristic values sent from the network side and the characteristic values of the UE group satisfy a certain condition, the network side requires the UE to perform a measurement. In this case, if the UE first makes determination according to the policy, the UE may further determine whether to perform a measurement or not according to the information carried in the measurement indication information. If the UE first determines that the UE needs to perform a measurement according to the measurement indication information, the UE further determines that it needs to perform a measurement according to the policy, and then performs a measurement process. The certain condition is set according to actual requirements, for example, the characteristic values sent from the network side are larger than the characteristic values of the UE group, or the characteristic values sent from the network side are lower than the characteristic values of the UE group.

As described above, in this embodiment of the present invention, after the UE groups are configured, the network side may constitute corresponding measurement and/or report mechanisms for different UE groups, instead of constituting mechanisms for each UE respectively, thereby facilitating the measurement control of the network side on the UEs. As for each UE in the UE group, upon receiving the indication information directed to the UE group, the UE determines whether the UE needs to perform a measurement or not according to the indication information. Furthermore, after the UE groups are configured, the network side sets corresponding indication information according to characteristics of the UE groups. If the user is of a high level or subscribes to a PPS, the network side generally has to ensure the access of the user, and may not consider the mobility of the user, so that no indication information is set for such UE group, or the indication information thereof is set as: the UE does not need to perform a measurement.

Embodiment 3 and Embodiment 4 of the method of the present invention are also provided, which are respectively described in detail below.

Embodiment 3 will be described now.

As each UE usually has a preferred cell, the preferred cell may be a cell with a preferred certain RAT or version/capability among different RATs or different versions of the same RAT, and certainly may also be a cell of other types.

When the UE has a preferred cell, if the information provided by the network side is cell list information, step 102 that the UE determines, according to the received measurement indication information, that the UE needs to perform a measurement further includes: determining, by the UE, whether the cell list information contains the preferred cell of the UE or not, and if the cell list information contains the preferred cell of the UE, determining that the UE needs to perform the measurement.

Specifically, the cell list information specifically includes information about neighboring cells of the current cell.

In Embodiment 3, the UE may further perform a periodic measurement according to actual requirements. The implementation of the periodic measurement is similar to that described above, and the details are not described herein again.

In Embodiment 3, the network side sends the cell list information to the UE, and the UE performs a measurement for the preferred cell, so as to reselect the preferred cell as quickly as possible, thus obtaining the services provided by the network in a better way and balancing the network load. Moreover, the UE does not need to perform the measurement process frequently.

Embodiment 4 will be described now.

Another circumstance may exist for the UE. That is, the UE has a corresponding preferred area, but currently the UE is not located in the preferred area. The preferred area may be specifically a tracking area (TA), a routing area (RA), or a local area (LA), and certainly may also be other kinds of areas, such as a localized service area (LSA) or an area formed by certain particular cells, for example, an area formed by private network cells.

In the above circumstance, if the information provided by the network side is information capable of identifying an area of a cell where the UE is currently located, step 102 that the UE determines, according to the received measurement indication information, that the UE needs to perform a measurement further includes: determining, by the UE, whether the area belongs to a preferred area of the UE or not according to the information about the area of the cell where the UE is currently located, and if the area does not belong to a preferred area of the UE, determining that the UE needs to perform a measurement; otherwise, determining that the UE does not need to perform a measurement.

The information capable of identifying the area of the cell where the UE is currently located provided by the network side may be specifically ID information of the area and the information may be sent through a broadcast message. Certainly, the information may be of other types and sent in various manners, as long as it is ensured to be received by the UE.

The measurement process performed by the UE may be initiated on all the neighboring areas, i.e., on cells in the neighboring areas, or initiated merely on the frequency layer where the preferred area is located.

Moreover, in order to further reduce the measurements performed by the UE, the UE may read a broadcast message of a neighboring cell, and determine whether the area which the neighboring cell belongs to is one of the preferred areas of the UE or not according to the information about the area of the cell carried in the received broadcast message. If the area which the neighboring cell belongs to is not one of the preferred areas of the UE, the UE does not take the neighboring cell as a measurement target cell, and does not perform the measurement on the neighboring cell; otherwise, the UE performs the measurement on the neighboring cell, and reselects the neighboring cell after determining through measurement that the neighboring cell satisfies the reselecting condition of the UE. After reselecting the cell in the preferred area, the UE stops performing the measurement on the other cells until the current cell cannot meet the resident condition of the UE any longer. In addition, the circumstance of failing to meet the resident condition of the UE may be determined according to a measurement S criterion in an idle state.

The above processes of reading the broadcast message of the neighboring cell and then making determination accordingly may be implemented after the UE decides to perform a measurement or at any time before the measurement.

In Embodiment 4, the network side sends the information about the area of the cell where the UE is currently located to the UE, and the UE performs the measurement when the area does not belong to a preferred area, i.e., the cell where the UE is currently located does not belong to the preferred area, so as to reselect the preferred area as quickly as possible, thus obtaining the services provided by the network in a better way and balancing the network load. Moreover, the UE does not need to perform the measurement process frequently.

In addition, Embodiment 3 and Embodiment 4 may also be combined. For example, the UE first performs the determination process in Embodiment 4, i.e., determining whether the area of the cell where the UE is currently located belongs to the preferred area or not, and if the area of the cell where the UE is currently located belongs to the preferred area, the UE does not need to perform any measurement process; otherwise, the UE first performs the determination process in Embodiment 3 instead of immediately performing the determination process, i.e., first determining whether any neighboring cell is located in the preferred area or not, and if there is some neighboring cell being located in the preferred area, the UE performs a measurement process. In this manner, the measurement frequency of the UE is further reduced.

Similarly, the above four embodiments may also be combined in various ways depending upon actual requirements, and the specific application conditions may be derived from the above embodiments, and the details are not described herein again.

Those of ordinary skill in the art should understand that, all or a part of the steps in the method of the embodiments may be performed by relevant hardware under the instruction of a certain program. The software corresponding to the embodiments may be stored in a computer readable storage medium.

Figure 2:
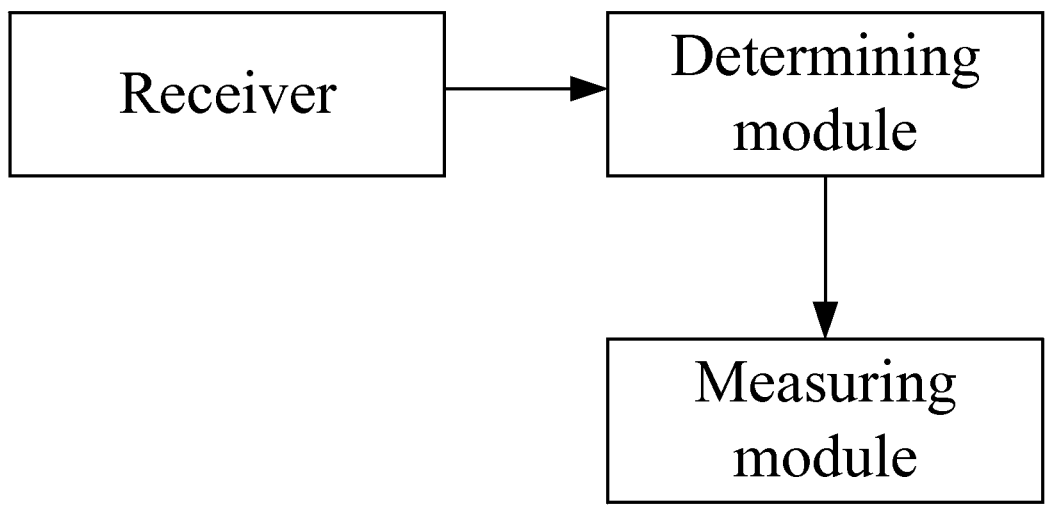
FIG. 2 is a schematic structural view of a UE according to an embodiment of the present invention.

The UE in the embodiment of the present invention is shown in FIG. 2, which includes a receiver, a determining module, and a measuring module.

The receiver is configured to receive measurement indication information provided by a network side, and send the measurement indication information to the determining module. As mentioned above, the measurement indication information may be load-related indication information at the network side, service-related indication information, or other types of information, and may include various types of indication information at the same time.

The determining module is configured to determine, according to the received measurement indication information, whether the UE needs to perform a measurement or not, and if the UE needs to perform a measurement, the determining module is configured to send notification information to notify the measuring module to perform a measurement process.

The measuring module is configured to perform a measurement process according to the received notification information.

The measurement process performed by the measuring module is any one selected from a group consisting of intra-frequency measurement, inter-frequency measurement, and inter-RAT measurement or any combination thereof.

The process performed by the determining module is similar to step 102 in FIG. 1 as well as relevant descriptions in Embodiment 1, Embodiment 2, and in subsequent descriptions.

For example, if the received measurement indication information is load-related indication information at the network side, the determining module is configured to determine whether the network side is currently overloaded or not according to the load-related indication information, and if the network side is currently overloaded, the determining module is configured to determine that the UE needs to perform a measurement process.

If the received load-related indication information at the network side is a load condition indicator, the determining, by the determining module, whether the network side is currently overloaded or not according to the load-related indication information further includes: determining a load value or load rating of the current load according to the load condition indicator, and comparing the obtained load value or load rating with a load threshold. If the load value or load rating exceeds the load threshold, the network side is determined to be overloaded.

If the received load-related indication information at the network side is an overload indicator, the determining module directly determines that the network side is currently overloaded according to the overload indicator.

If the measurement indication information received by the determining module is service-related indication information, the determining module is configured to determine, according to the service-related indication information, whether the service related information at the network side and service information of the UE satisfy a preset relationship or not, and if the service related information at the network side and service information of the UE satisfy a preset relationship, the determining module is configured to determine that the UE needs to perform a measurement.

If the received service-related indication information is specifically information about services supported by the network under the indication of the network side, the determining, by the determining module, whether the service related information at the network side and the service information of the UE satisfy a preset relationship or not further includes: determining whether services at the network side are consistent with services of the UE or not, and if services at the network side are not consistent with services of the UE, determining that the preset relationship is satisfied.

If the received service-related indication information is differentiation indication information, the determining, by the determining module, whether the service related information at the network side and the service information of the UE satisfy a preset relationship or not further includes: determining a relationship between services supported by the network side and services of the UE according to the differentiation indication information, and determining whether the relationship conforms to the preset relationship or not according to a preset measurement policy. As mentioned above, the preset measurement policy may be set in the following manners. When the priority and/or level indicator of the services of the UE is higher than the services supported by the network side, it is determined that the preset relationship is satisfied, so that a measurement needs to be performed. Alternatively, when the priority and/or level indicator of the services of the UE is lower than the services supported by the network side, it is determined that the preset relationship is satisfied, so that a measurement needs to be performed.

If the received service-related indication information includes both the service indication information and the differentiation indication information, the determining, by the determining module, whether the services at the network side and the services of the UE satisfy a preset relationship or not further includes: first determining whether the services of the UE are consistent with the services supported by the network side or not, and if the services of the UE are not consistent with the services supported by the network side, directly determining that a measurement needs to be performed; otherwise, further determining a relationship between the services of the UE and the services supported by the network side, and performing a measurement according to a preset policy when the priority and/or level indicator of the services of the UE is higher than the services supported by the network side or when the priority and/or level indicator of the services of the UE is lower than the services supported by the network side. Certainly, other processing manners may also be set according to actual requirements, which are performed based on similar principles and may not be described herein again.

As mentioned above, the UEs in the network may be grouped according to the characteristics thereof. Therefore, after determining that UEs in the UE group having particular characteristics need to perform a measurement, the network side may carry the measurement indication information and UE group information such as ID and attribute information of the UE in a broadcast message, or notify the UE group information to the UEs through downlink signaling such as downlink RRC, L1/L2 control signaling, and MAC header.

After the UE groups are configured, if the indication information sent from the network side carries the UE group information, the determining module first determines whether the UE group information carried in the indication information includes information about the UE group that the UE belongs to, and if the UE group information carried in the indication information includes information about the UE group that the UE belongs to, the determining module determines whether the UE needs to perform a measurement process or not according to the measurement indication information. Alternatively, the UE first determines whether the UE needs to perform a measurement or not according to the measurement indication information, and further determines whether the measurement indication information carries information about the UE group that the UE belongs to after determining that the UE needs to perform the measurement, and if the measurement indication information does not carry information about the UE group that the UE belongs to, the UE does not perform any measurement process; otherwise, the UE performs a measurement process. The specific determination sequence and method are not limited herein, but both the network indication and the attribute of the UE group should be considered.

After the UE groups are configured, if the indication information received by the determining module is: the UE does not need to perform a measurement, the determining module determines that the UE is not required to perform a measurement, and does not send any notification to the measuring module.

After the UE groups are configured, if the indication information received by the determining module carries information about characteristic values directed to the corresponding UE group set by the network side, the determining module first compares the information about characteristic values carried in the measurement indication information with characteristic values of the UE group, and determines whether the UE needs to perform a measurement when satisfying other conditions of the indication information according to a preset policy. Alternatively, the determining module first determines whether the UE needs to perform a measurement or not according to the measurement indication information, and further compares the information about characteristic values carried in the measurement indication information with characteristic values of the UE group after determining that the UE needs to perform a measurement, and then determines whether the UE needs to perform a measurement or not according to a preset policy. As described above, the preset policy may be configured in the following manners according to actual requirements. For example, when the characteristic values sent by the network side and the characteristic values of the UE group satisfy a certain condition, no matter what kind of information is carried in the measurement indication information, the UE does not need to perform a measurement. Alternatively, only when the characteristic values sent from the network side and the characteristic values of the UE group satisfy a certain condition, the network side requires the UE to perform a measurement. In addition, the certain condition is set according to actual requirements, which may include, for example, the characteristic values sent from the network side are larger than the characteristic values of the UE group, or the characteristic values sent from the network side are lower than the characteristic values of the UE group. As mentioned above, the specific determination sequence and method are not limited herein, but both the measurement indication information and the attribute of the UE group should be considered.

Corresponding to Embodiment 3 of the method of the present invention, in an embodiment of the UE of the present invention, if the measurement indication information received by the receiver in the UE includes cell list information, the determining module in the UE is configured to determine whether the cell list information contains a preferred cell of the UE or not, and determine that the UE needs to perform a measurement process if the cell list information contains a preferred cell of the UE.

Corresponding to Embodiment 4 of the method of the present invention, in an embodiment of the UE of the present invention, if the measurement indication information received by the receiver in the UE includes information capable of identifying an area of a cell where the UE is currently located, the determining module in the UE is configured to determine whether the area belongs to a preferred area of the UE or not according to the information about the area of the cell where the UE is currently located, and if the area does not belong to a preferred area of the UE, i.e., the current cell does not belong to the preferred area, the determining module in the UE is configured to determine that the UE needs to perform a measurement process.

As mentioned above, the UE may determine not to perform any measurement on a certain neighboring cell after determining that the neighboring cell does not belong to the preferred area, and the process may be performed after the UE determines to perform a measurement or at any time before the measurement.

Specifically, the receiver of the UE receives a broadcast message from a neighboring cell, and sends the broadcast message to the determining module. The determining module further determines whether the area belongs to a preferred area of the UE or not according to the information about the area of the cell carried in the broadcast message, and if the area does not belong to a preferred area of the UE, the UE stops performing the measurement on the cell; otherwise, if the area belongs to the preferred area and the UE is able to reselect the cell, the UE stops performing the measurement.

The UE further includes a measurement control module, configured to receive notification information sent from the determining module, start counting the time upon receiving the notification, and send the received notification information to the measuring module after determining that a set measurement period is reached. As mentioned above, the measurement period may be set by the UE itself or by the network side. In this case, the receiver of the UE further needs to receive the measurement period sent from the network side, and then sends the measurement period to the measurement control module.

The measurement control module may also be configured to determine whether the UE needs to initiate an uplink connection or not after receiving the notification from the determining module, and send the received notification information to the measuring module just before determining that the UE needs to initiate the uplink connection.

The UE may further include a sending module, configured to send a measurement result obtained by the measuring module to a network-side device. The sending module may also be configured to send the measurement result only after a set report criterion is currently satisfied. The report criterion may be a report threshold or a report period.

The sending module may send the measurement result to the network-side device in various manners, for example, notifying the network of the measurement result by carrying the measurement result in signaling, or directly notifying the network through dedicated signaling, or notifying the network through L1/L2 control signaling or through an MAC header.

In the embodiment of the present invention, the UE performs a measurement process only after receiving the indication information from the network side and determining that the UE needs to perform a measurement according to the indication information, so that the UE is able to perform a measurement according to requirements of the network side. Therefore, it is ensured that the UE may not perform the measurement frequently but pertinently, and the impact of the measurement on the performance of the UE is reduced to the utmost extent.

In the embodiment of the present invention, the UE further determines whether the UE needs to perform a measurement or not according to the load-related indication information, so as to enable the network side to obtain the measurement result from the UE whenever necessary. Therefore, it is ensured that the UE may not perform the measurement frequently but pertinently, and the impact of the measurement on the performance of the UE is reduced to the utmost extent. When the network side needs to perform an RAT relocation on the UE in the case that the load exceeds the preset threshold, the RAT relocation is performed according to the received measurement result. The network side may also perform network configuration and optimization according to the received measurement result, and make analysis according to the received measurement result in a complicated environment.

In the embodiment of the present invention, the UE further determines whether the UE needs to perform a measurement or not according to the service-related indication information, so as to enable the network side to obtain the measurement result from the UE whenever necessary. Therefore, it is ensured that the UE may not perform the measurement frequently but pertinently, and the impact of the measurement on the performance of the UE is reduced to the utmost extent. When the network side needs to perform an RAT relocation on the UE, the RAT relocation is performed according to the received measurement result. The network side may also perform network configuration and optimization according to the received measurement result, and make analysis according to the received measurement result in a complicated environment.

In the embodiment of the present invention, the UE may consider both the load condition at the network side and the service-related indication information, thereby further ensuring that the UE only performs a measurement process when it is needed. Therefore, the measurement frequency of the UE is further reduced, the UE is enabled to perform measurements pertinently, and the impact of the measurement on the performance of the UE is also lowered.

In the embodiment of the present invention, the UE controls the measurement frequency by using the measurement period, and performs the measurement just before the UE needs to initiate the uplink connection. Therefore, the measurement frequency of the UE is further reduced, the UE is enabled to perform measurements pertinently, and the impact of the measurement on the performance of the UE is also lowered.

In the embodiment of the present invention, the UE further determines a report frequency of reporting the measurement result to the network side according to the report criterion, which further reduces the impact of the measurement on the performance of the UE.

In an embodiment of the present invention, a network-side device includes an indication information providing module, configured to determine measurement indication information required to be sent to a UE, and send the determined measurement indication information to the UE.

As described above, the measurement indication information sent by the indication information providing module may be load-related indication information at the network side, service-related indication information, cell list information and ID of the current cell, or other types of information, and may include various types of indication information at the same time.

The indication information providing module further includes an indication information determining module and an indication information sending module. The indication information determining module is configured to determine the measurement indication information required to be sent to the UE, and the indication information sending module is configured to send the determined measurement indication information to the UE.

After the UE groups are configured, the indication information determining module is further configured to carry the measurement indication information and the UE group information in a broadcast message or downlink signaling, after determining that the UEs in the UE group having particular characteristics need to perform a measurement, and send the broadcast message or downlink signaling to the indication information sending module.

After the UE groups are configured, the indication information determining module is further configured to set corresponding measurement indication information according to the characteristics of the UE groups. For example, if the user is of a high level or subscribes to a prepaid service (PPS), the network side generally has to ensure the access of the user, and may not consider the mobility of the user, so that no indication information is set for such UE group, or the indication information thereof is set as: the UE does not need to perform a measurement.

After the UE groups are configured, the indication information determining module is further configured to set characteristic values directed to the UE groups, and send the information about characteristic values to UEs in the UE group through the indication information sending module. The indication information sending module may send the information about characteristic values by means of broadcasting, paging, RRC signaling, L1/L2 control information, MAC header, and so on. The subsequent process of the UE upon receiving the characteristic values is similar to the above, and the details are not described herein again.

In the embodiment of the present invention, the network-side device controls the measurements performed by the UE, so that the UE may not perform the measurements blindly but reasonably.

Moreover, in the embodiments of the present invention, the network-side device may also perform various measurement controls according to actual requirements, thereby diversifying the embodiments of the present invention.

Figure 3:
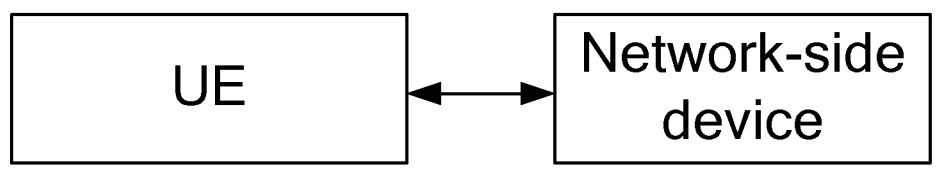
FIG. 3 is a schematic structural view of a wireless communication system according to an embodiment of the present invention.

Referring to FIG. 3, a system including a network-side device and a UE is provided in an embodiment of the present invention.

The network-side device is configured to determine measurement indication information required to be sent to the UE, and send the determined measurement indication information to the UE.

The UE is configured to receive the measurement indication information provided by the network side, determine whether the UE needs to perform a measurement or not according to the measurement indication information, and perform a measurement process after determining that the UE needs to perform the measurement. The UE is further configured to send a measurement result to the network-side device.

Specifically, in the system according to the embodiment of the present invention, the UE has a structure as shown in FIG. 2, and includes all the modules in FIG. 2. As described above, in the system according to the embodiment of the present invention, the network-side device includes a service information providing module. The UE and the network-side device in the system have been described above in detail, which are not repeated herein again.

In view of the above, in the embodiments of the present invention, the system controls the measurements performed by the UE, so that the UE may not perform the measurements blindly but reasonably. Besides, the system may also perform various measurement controls according to actual requirements, thus diversifying the embodiments of the present invention.

The sequence number of the embodiment does not represent the priority of each embodiment, and especially that does not represent the best mode.

It will be apparent to those skilled in the art that various modifications and variations can be made to the present invention without departing from the scope or spirit of the invention. In view of the foregoing, it is intended that the present invention cover modifications and variations of this invention provided that they fall within the scope of the following claims and their equivalents.

What is claimed is:

1. A measurement control method, comprising:
   receiving, by a user equipment (UE), measurement indication information from a network, the measurement indication information including an identification about a first area where a current cell belongs to, the current cell being a cell where the UE is currently located;
   determining, by the UE, whether the first area is within a preferred area of the UE, according to the identification about the first area;
   reading, by the UE, a broadcast message about a neighboring cell, wherein the broadcast message includes an identification about a second area where the neighboring cell belongs to;
   determining, by the UE, whether the second area is within the preferred area of the UE according to the identification about the second area;
   performing, by the UE, a measurement on a frequency layer where the neighboring cell is located, if the first area is not within the preferred area of the UE, and the second area is within the preferred area of the UE; and
   moving, by the UE, from the current cell to the neighboring cell upon determining, according to the measurement, that the neighboring cell satisfies a reselection condition of the UE.

2. The method of claim 1, wherein the preferred area of the UE is a tracking area, or a routing area, or a local area, or a localized service area.

3. The method of claim 1, wherein
   the measurement is one or more selected from a group consisting of intra-frequency measurement, inter-frequency measurement, and inter-RAT measurement.

4. The method of claim 1, further comprising: determining, by the UE, whether a preset measurement period is reached or not, and
   wherein the performing the measurement occurs after the preset measurement period is reached.

5. The method of claim 4, wherein the preset measurement period is set according to one or more factors selected from a network service differentiation condition, a network load condition, and UE information.

6. The method of claim 1, further comprising: determining, by the UE, to initiate an uplink connection, and
   wherein the performing the measurement occurs before the UE initiates the uplink connection.

7. A user equipment (UE), comprising a receiver and a processor, wherein,
   the receiver is configured to receive measurement indication information from a network, the measurement indication information including an identification about a first area where a current cell belongs to, the current cell being a cell where the UE is currently located, and to receive a broadcast message about a neighboring cell, wherein the broadcast message includes an identification about a second area where the neighboring cell belongs to; and
   the processor is configured to determine whether the first area is within a preferred area of the UE, according to the identification about the first area, to read the broadcast message of the neighboring cell to obtain the identification about the second area, to determine whether the second area is within the preferred area of the UE according to the obtained identification, to perform a measurement on a frequency layer where the neighboring cell is located, if the first area is not within the preferred area of the UE, and the second area is within the preferred area of the UE, and to enable the UE to be moved from the current cell to the neighboring cell upon determining, according to the measurement, that the neighboring cell satisfies a reselection condition of the UE.

8. The UE of claim 7, wherein, the measurement is one or more selected from a group consisting of intra-frequency measurement, inter-frequency measurement, and inter-RAT measurement.

9. The UE of claim 7, wherein the processor is further configured to obtain cell list information which lists information about neighboring cells of the current cell, and determine, before the measurement is performed, the cell list information includes information about the neighboring cell, and
   wherein the measurement is performed on a frequency layer where the neighboring cell is located.

10. The UE of claim 7, wherein the processor is configured to perform the measurement upon determining that a preset measurement period expires.

11. The UE of claim 10, wherein the preset measurement period is set according to one or more factors selected from a network service differentiation condition; a network load condition; and UE information.

12. The UE of claim 7, wherein the processor is configured to perform the measurement before initiating an uplink connection.

13. The UE of claim 7, wherein the preferred area of the UE is a tracking area, or a routing area, or a local area, or a localized service area.

\* \* \* \* \*